(12) United States Patent
Price (10) Patent No.: US 9,163,456 B2
(45) Date of Patent: Oct. 20, 2015

(54) TIRE STEP SYSTEM AND METHOD (71) Applicant: Barry Price, Shamrock, TX (US)

(72) Inventor: Barry Price, Shamrock, TX (US)

( * ) Notice: Subject to any disclaimer, the term of this patent is extended or adjusted under 35 U.S.C. 154(b) by 0 days.

(21) Appl. No.: 14/200,021

(22) Filed: Mar. 7, 2014

(65) Prior Publication Data

US 2015/0252617 A1 Sep. 10, 2015

(51) Int. Cl.
*E06C 1/39* (2006.01)
*E06C 1/38* (2006.01)
*E06C 1/397* (2006.01)
*E06C 7/18* (2006.01)
*B60R 3/00* (2006.01)

(52) U.S. Cl.
CPC . *E06C 1/38* (2013.01); *B60R 3/007* (2013.01); *E06C 1/39* (2013.01); *E06C 1/397* (2013.01); *E06C 7/183* (2013.01)

(58) Field of Classification Search
CPC .............. E06C 7/48; E06C 1/34; E06C 1/39; E06C 1/397; B60R 3/007
See application file for complete search history.

(56) References Cited

U.S. PATENT DOCUMENTS

| | | | | | |
|---|---|---|---|---|---|
| 387,045 | A | * | 7/1888 | Braun | 182/33.2 |
| 2,805,703 | A | * | 9/1957 | Wise | 182/33.3 |
| 4,541,507 | A | * | 9/1985 | Gibellato | 182/86 |
| 5,072,955 | A | * | 12/1991 | Holland et al. | 280/32.5 |
| D356,164 | S | * | 3/1995 | Rinke | D25/64 |
| D376,784 | S | | 12/1996 | Miller | |
| 5,669,463 | A | * | 9/1997 | Robertson | 182/116 |
| 6,044,928 | A | | 4/2000 | Law et al. | |
| 2006/0157301 | A1 | | 7/2006 | Embretsen | |
| 2010/0012431 | A1 | * | 1/2010 | Ehnes | 182/150 |
| 2010/0122871 | A1 | | 5/2010 | Gottlinger | |

* cited by examiner

*Primary Examiner* — Alvin Chin-Shue
(74) *Attorney, Agent, or Firm* — Shannon L Warren (57) ABSTRACT

A vehicle step is disclosed comprising a frame and a plurality of steps. Said vehicle step comprises a first side, a second side, a front, and a back. Said frame supports said plurality of steps. Said plurality of steps comprise, at least, a first step and an adjustable step. Said first step serves as a platform for a user of said vehicle step to gain access to said adjustable step. Said adjustable step comprises a one or more hinges. Said adjustable step is rotateably attached to said frame such that said back of said vehicle step can be placed near a wheel, and said adjustable step can rotate on said one or more hinges over and rest on a top portion of said wheel.

3 Claims, 11 Drawing Sheets

TIRE STEP SYSTEM AND METHOD

BACKGROUND

The current disclosure relates generally to an improved tire step system and method. Examples of truck steps can be found in U.S. Patent or U.S. Pat. No. 5,669,463, Ser. No. 10/905,670, D376,784, Ser. No. 12/404,639, U.S. Pat. No. 6,044,928. None of the known patents are seen to anticipate the current claims.

SUMMARY

A vehicle step is disclosed comprising a frame and a plurality of steps. Said vehicle step comprises a first side, a second side, a front, and a back. Said frame supports said plurality of steps. Said plurality of steps comprise, at least, a first step and an adjustable step. Said first step serves as a platform for a user of said vehicle step to gain access to said adjustable step. Said adjustable step comprises a one or more hinges. Said adjustable step is rotateably attached to said frame such that said back of said vehicle step can be placed near a wheel, and said adjustable step can rotate on said one or more hinges over and rest on a top portion of said wheel.

DETAILED DESCRIPTION

Described herein is a vehicle step system and method. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIGS. 1A, 1B, 1C 1D and 1E illustrate a perspective overview, an elevated first side view, an elevated second side view, an elevated front view of a vehicle step 100 and an isometric elevated overview. In one embodiment, said vehicle step 100 can permit ease of access to serviceable areas of vehicles (such as semi-trucks) by using a tire of a vehicle for support. In one embodiment, said vehicle step 100 can comprise a frame 101 comprising a wheel assembly 102, a plurality of steps and a one or more handrails. In one embodiment, said plurality of steps can comprise a first step 104a, a second step 104b, a third step 104c and an adjustable step 104d. In one embodiment, said one or more handrails can comprise a first handrail 106a and a second handrail 106b. In one embodiment, said one or more handrails can comprise a portion of said frame 101. In one embodiment, said plurality of steps can attach to said frame 101. In one embodiment, said frame 101 can comprise a one or more legs comprising a first leg 108a, a second leg 108b, a third leg 108c, and a fourth leg 108d. In one embodiment, said one or more legs can comprise a one or more feet comprising a first foot 110a and a second foot 110b which can be attached to the bottom of said first leg 108a and said fourth leg 108d, respectively. In one embodiment, said one or more feet can provide further stabilization of said vehicle step 100. In one embodiment, said wheel assembly 102 can comprise a first wheel 112a and a second wheel 112b connected by an axle 114. In one embodiment, said wheel assembly 102 can attach to said frame 101 at the base of said third step 104c. In one embodiment, said wheel assembly can permit said vehicle step 100 to be transported without lifting said vehicle step 100 off the ground. In one embodiment, said plurality of steps can be separated by a one or more step heights (comprising a first height 116a, a second height 116b, a third height 116c and a fourth height 116d). In one embodiment, said one or more step spacings can all be equal pursuant to OSHA regulations. Likewise, said plurality of steps can each comprise equal width and depth. In one embodiment, said first height 116a, said second height 116b, said third height 116c can be equal, and said fourth height 116d can be variable, as discussed below, and therefore can be set to be equal to said first height 116a. In one embodiment, said plurality of steps can each comprise a step depth (said first step 104a can comprise a first step depth 118a, said second step 104b can comprise a second step depth 118b, said third step 104c can comprise a third step depth 118c, and said adjustable step 104d can comprise a fourth step depth 118d), as illustrated. In one embodiment, said first step depth 118a, said second step depth 118b and said third step depth 118c can be substantially identical to said 116a-116c; consequently, a slope 120 of said plurality of steps can be about 45 degrees.

Said vehicle step 100 comprises a first side 130a, a second side 130b, a front 132a and a back 132b.

Figure 1A:
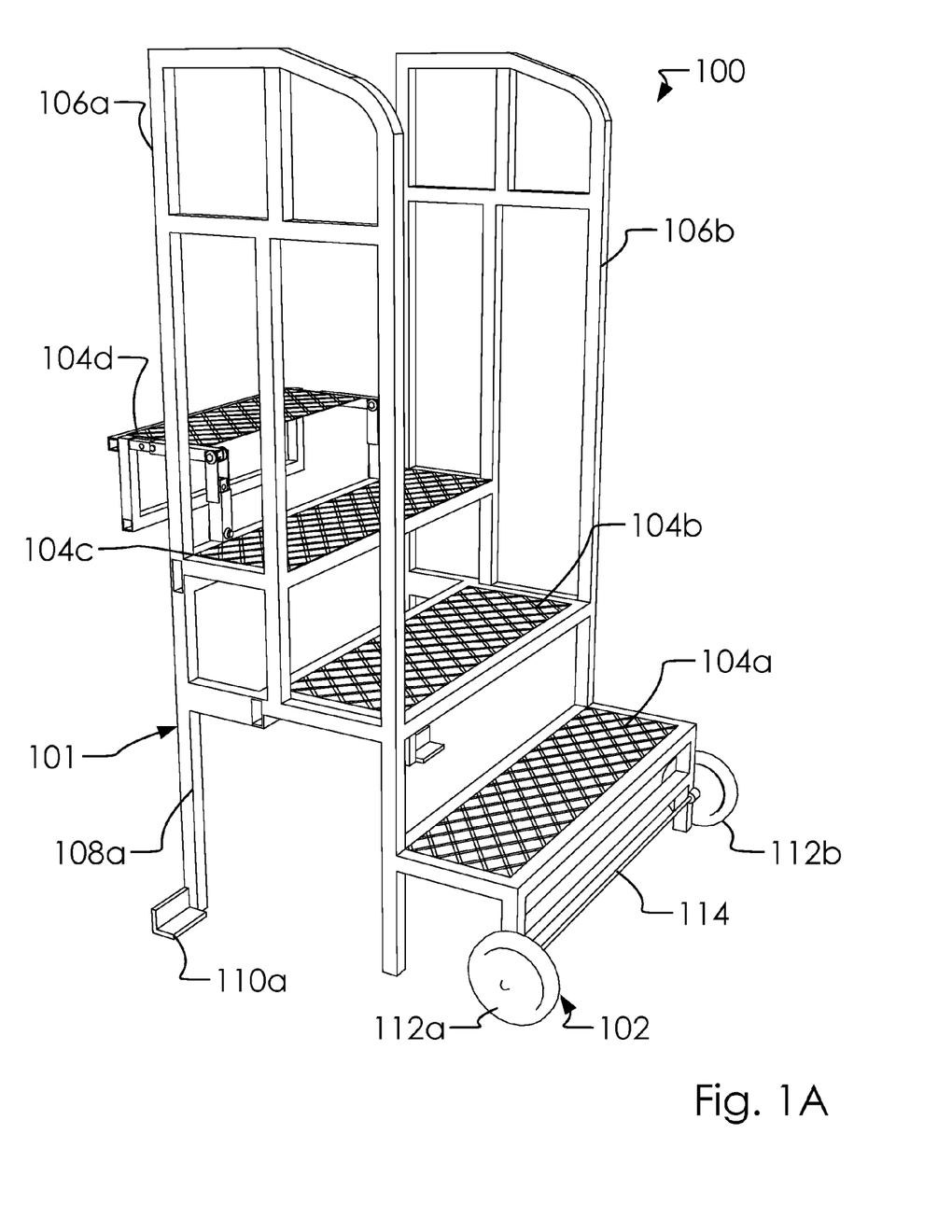
FIGS. 1A, 1B, 1C 1D and 1E illustrate a perspective overview, an elevated first side view, an elevated second side view, an elevated front view of a vehicle step and an isometric elevated overview.
Figure 1B:
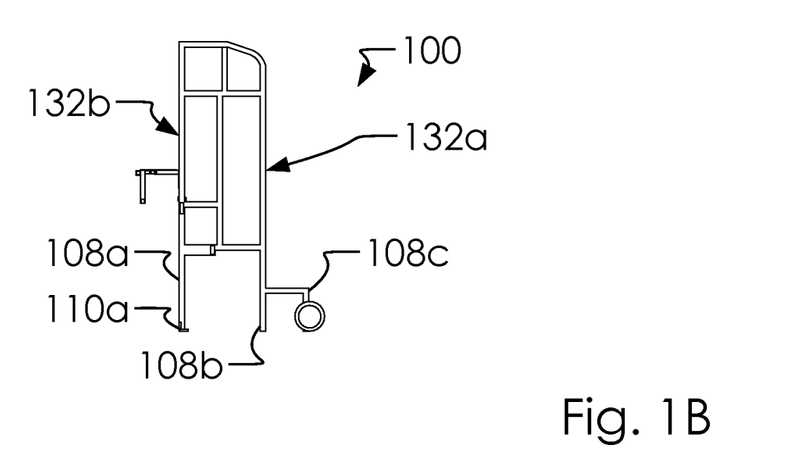
Figure 1C:
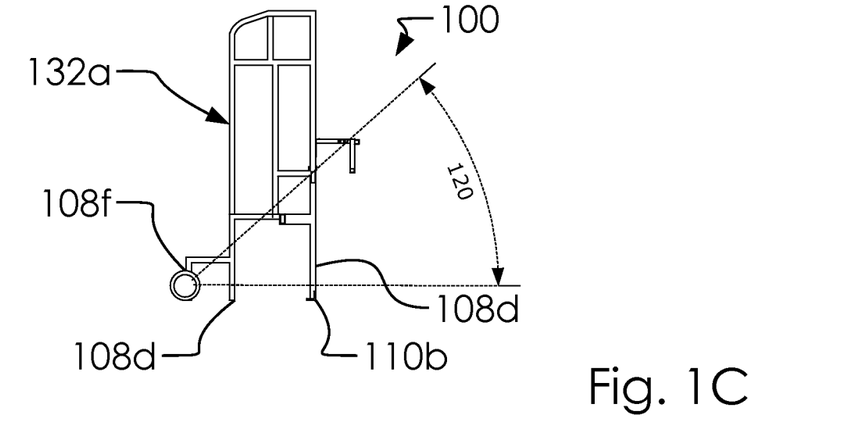
Figure 1D:
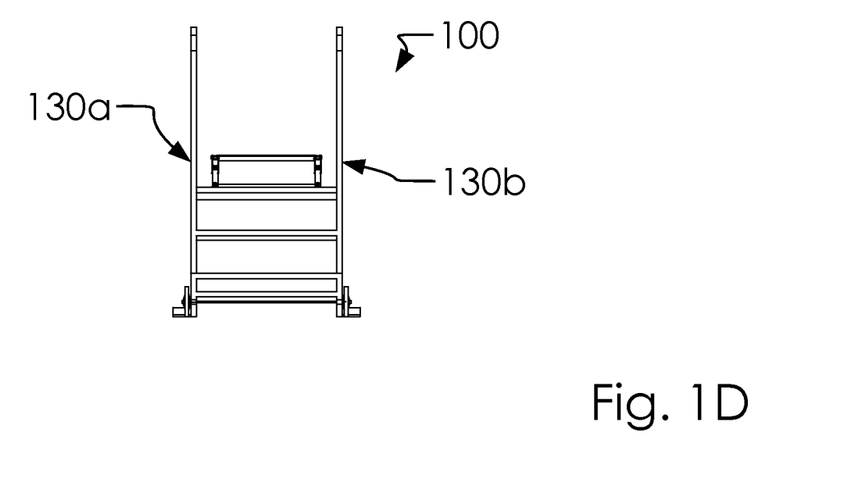
Figure 1E:
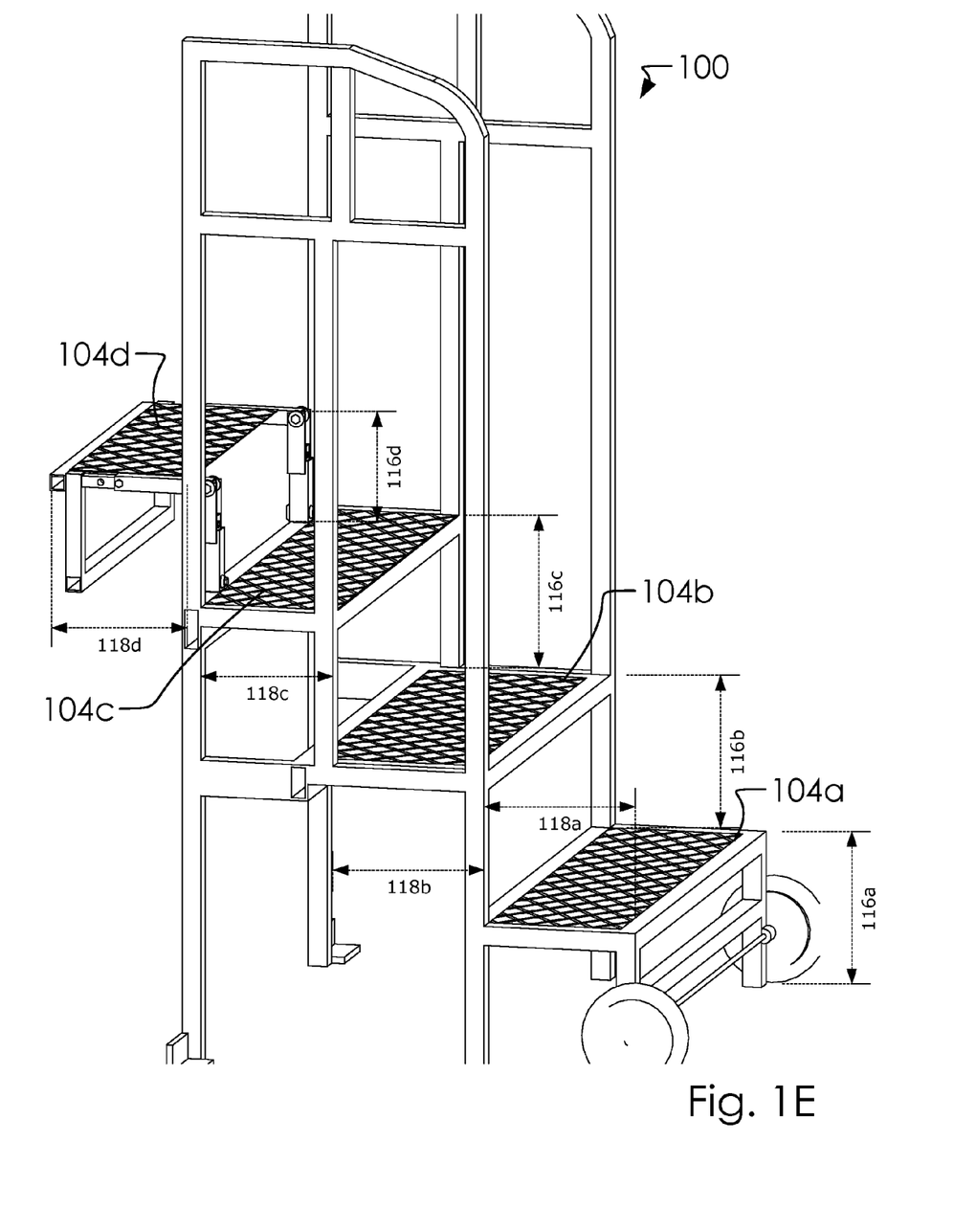
Figure 2A:
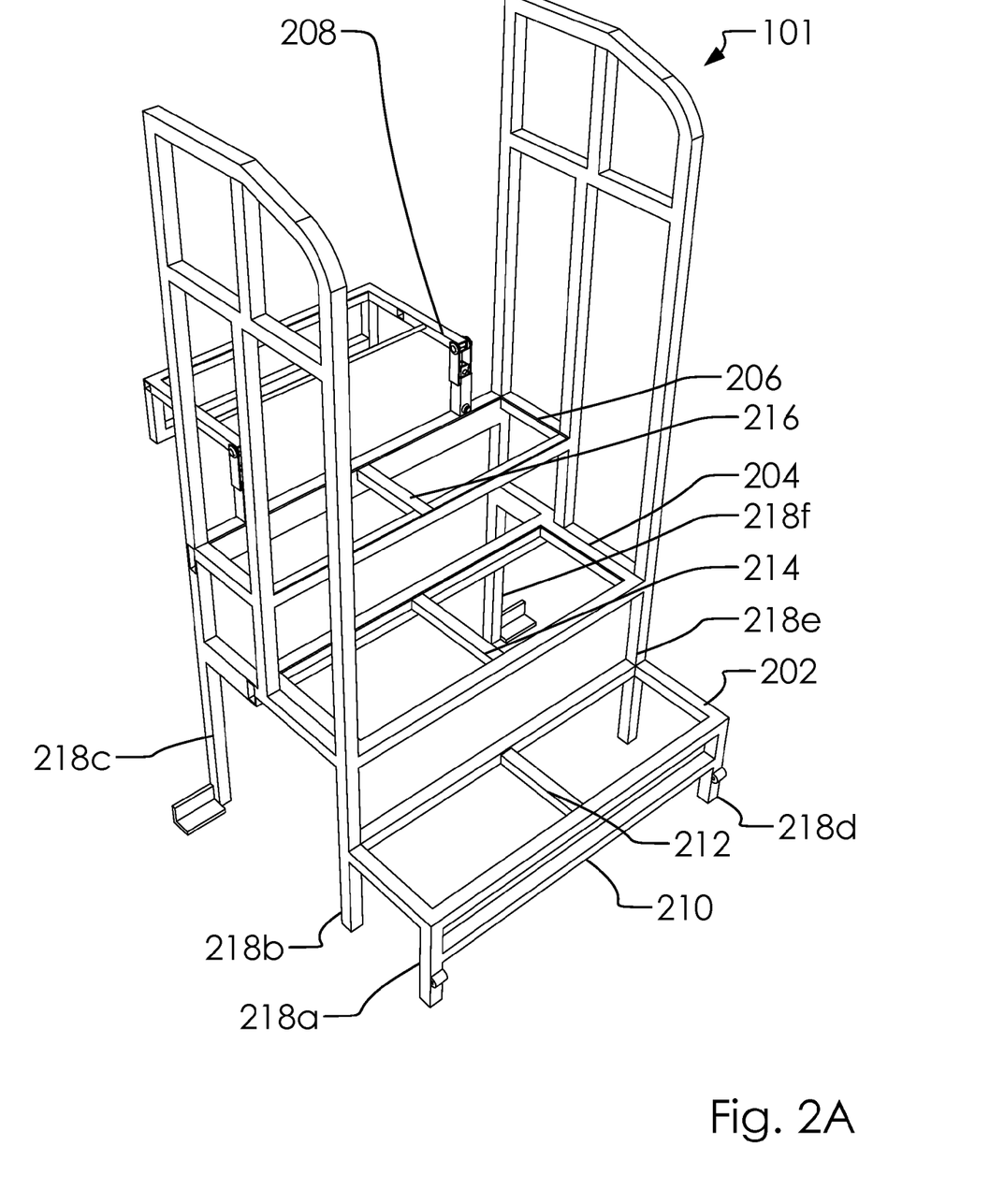
FIGS. 2A, 2B and 2C illustrate a perspective overview, an elevated side view and an elevated front view of said frame.
Figure 2B:
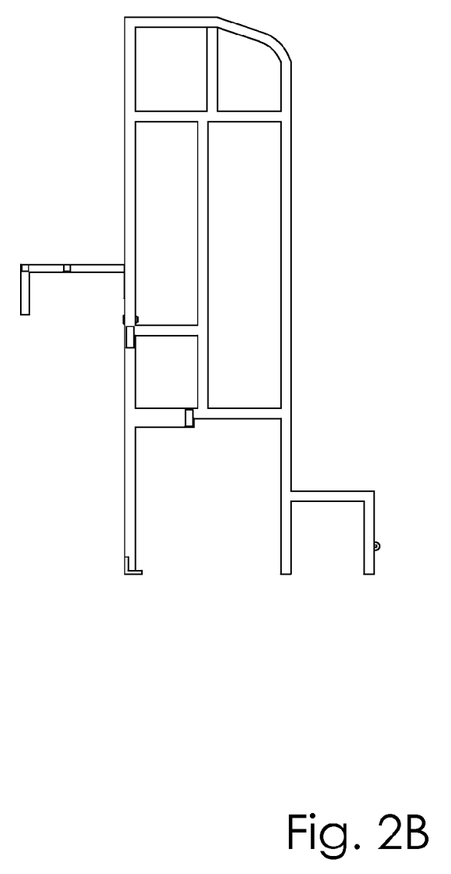
Figure 2C:
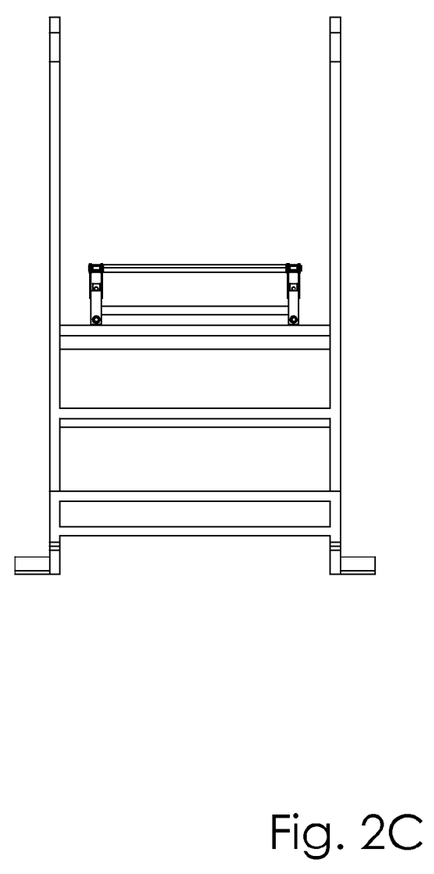

FIGS. 2A, 2B and 2C illustrate a perspective overview, an elevated side view and an elevated front view of said frame 101. In one embodiment, said frame 101 can comprise a one or more horizontal portions, a one or more vertical portions, a one or more step frames, said one or more legs. In one embodiment, said one or more step frames can comprise a first step frame 202, a second step frame 204, a third step frame 206, and an adjustable step frame 208. In one embodiment, said one or more step frames can comprise four of said one or more horizontal portions arranged in a substantially rectangular pattern and further comprise a support across a central portion of said rectangular pattern. In one embodiment, said first step frame 202 can comprise a support 212; said second step frame 204 can comprise a support 214; and said third step frame 206 can comprise a support 216. In one embodiment, said one or more vertical portions can comprise a first vertical portion 218a, a second vertical portion 218b, a third vertical portion 218c, a fourth vertical portion 218d, a fifth vertical portion 218e, and a sixth vertical portion 218f. In one embodiment, said one or more step frames can attach to said one or more vertical portions, as illustrated or as known in the art. In one embodiment, said one or more horizontal portions can comprise a cross bar 210 between said first vertical portion 218a and said fourth vertical portion 218d.

Figure 3:
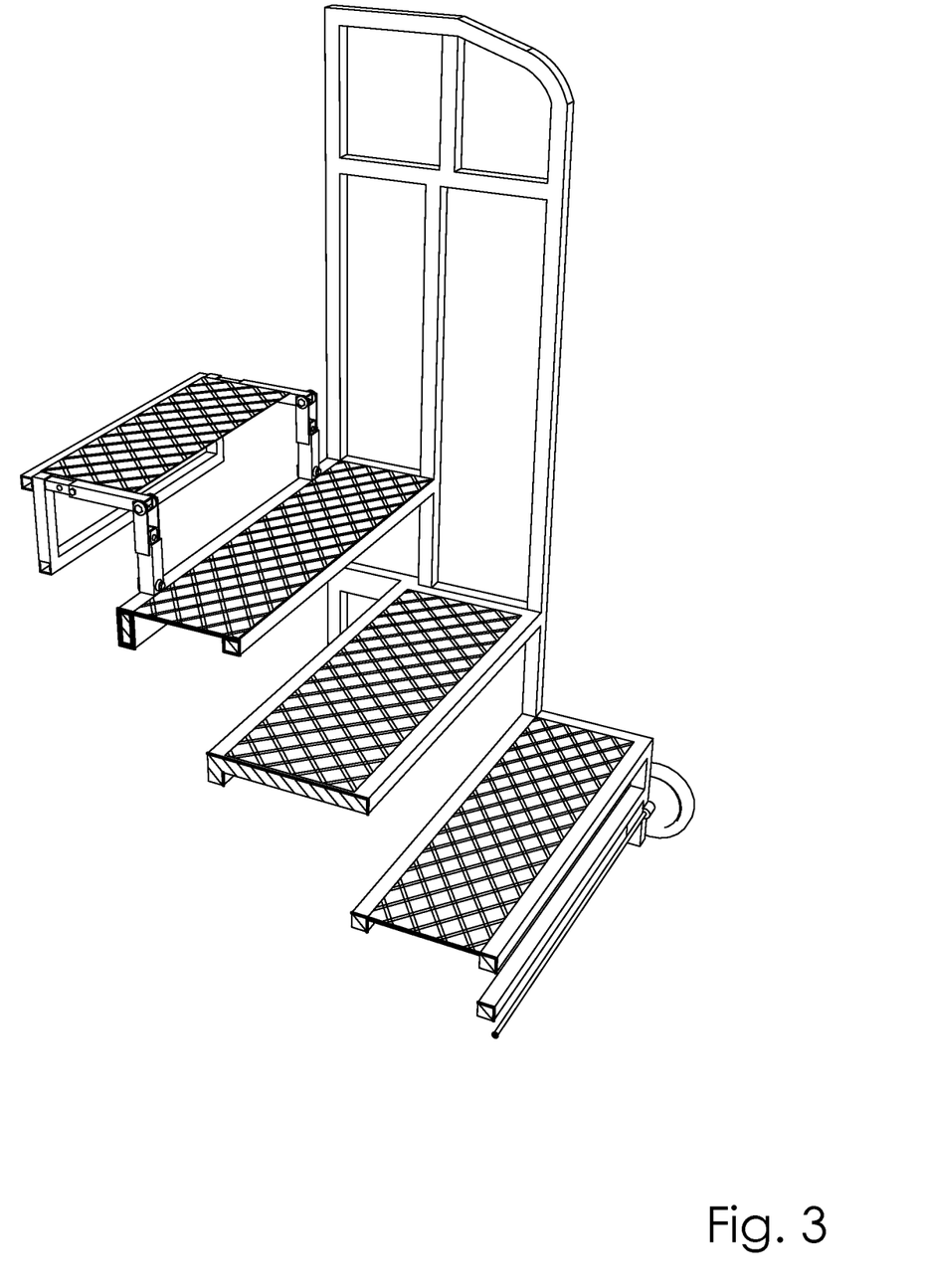
FIG. 3 illustrates a perspective overview of a cross-section view of said vehicle step.

FIG. 3 illustrates a perspective overview of a cross-section view of said vehicle step 100. Detailed versions of this cross-section view of said vehicle step 100 will be used for FIG. 4A-4E, as follows.

Figure 4A:
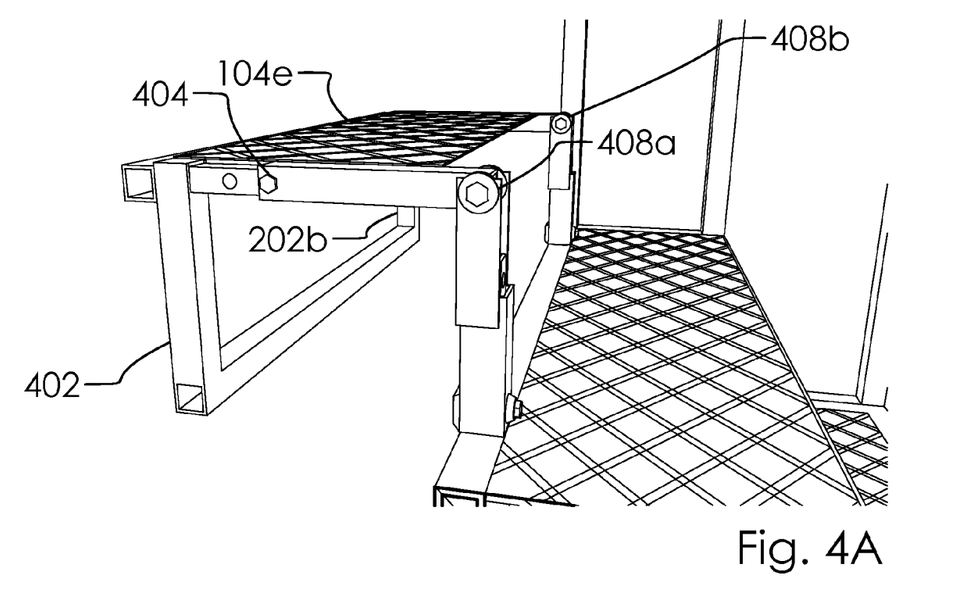
FIGS. 4A and 4B illustrate a perspective view of an adjustable step in a horizontally contracted position and an expanded position, respectively.
Figure 4B:
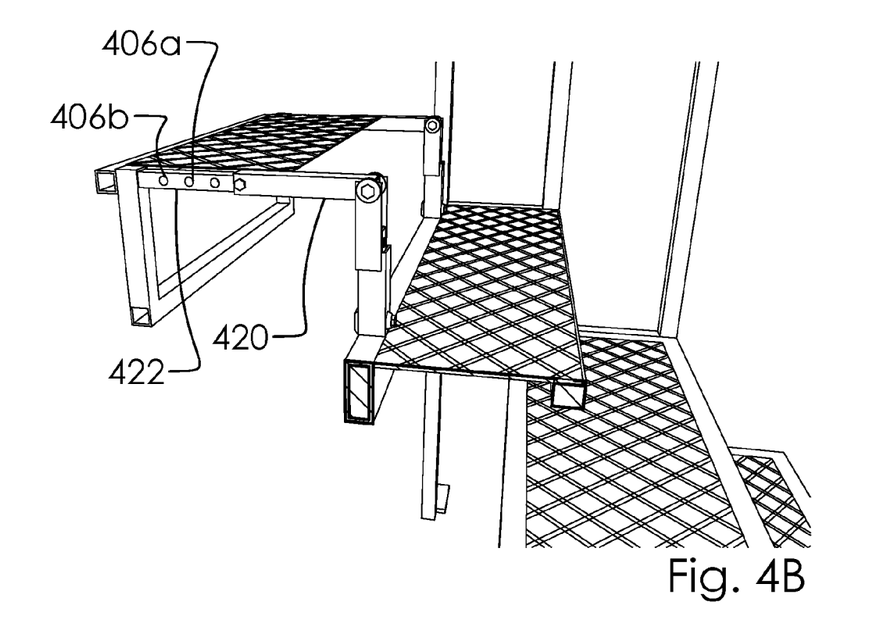

FIGS. 4A and 4B illustrate a perspective view of an adjustable step 104e in a horizontally contracted position and a horizontally expanded position, respectively. In one embodiment, said plurality of steps can comprise said adjustable step 104e which can be similar to said adjustable step 104d described and illustrated above. In one embodiment, a bracket 402 can be attached to the end of said adjustable step 104e. In one embodiment, said bracket 402 can limit movement of said vehicle step 100 by securing onto the inside wall of a supporting truck tire to prevent said vehicle step 100 from moving away. In one embodiment, said adjustable step 104e adjustments can be secured by a fastener 404. In one embodiment, said fastener 404 can be used on one or both sides of said adjustable step 104e. In one embodiment, said fastener 404 can securely fixate said adjustable step 104e at certain positions based on the location of a plurality of adjustment holes (such as an adjustment hole 406a and an adjustment hole 406b). In one embodiment, more or less of said plurality of adjustment holes may be used to include one or more adjustable lengths of said adjustable step 104e. In one embodiment, said adjustable step 104d can comprise an outer tubing 420 and an inner tubing 422. In one embodiment, said adjustable step 104e can be adjusted horizontally by disengaging said fastener 404, pushing or pulling said adjustable step 104e to desired position, and locking said adjustable step 104e into said plurality of adjustment holes. In one embodiment, said adjustable step 104e can be adjusted to permit proper clearance of said bracket 402 over a width of a tire. In one embodiment, said adjustable step 104e can comprise a one or more hinges, which can comprise a first hinge 408a and a second hinge 408b. Said adjustable step 104d can comprise an outer tubing 430a and an inner tubing 430b; which function in a telescoping manner. For example, in one embodiment, said inner tubing 422 can comprise a smaller external width and height (external dimensions) than said outer tubing 420 has as internal width and height, as illustrated. Thus, said inner tubing 422 can be configured to selectively slide into and out of said outer tubing 420. In one embodiment, said plurality of adjustment holes can be used to affix said inner tubing 422 to said outer tubing 420, as is known in the art.

Figure 4C:
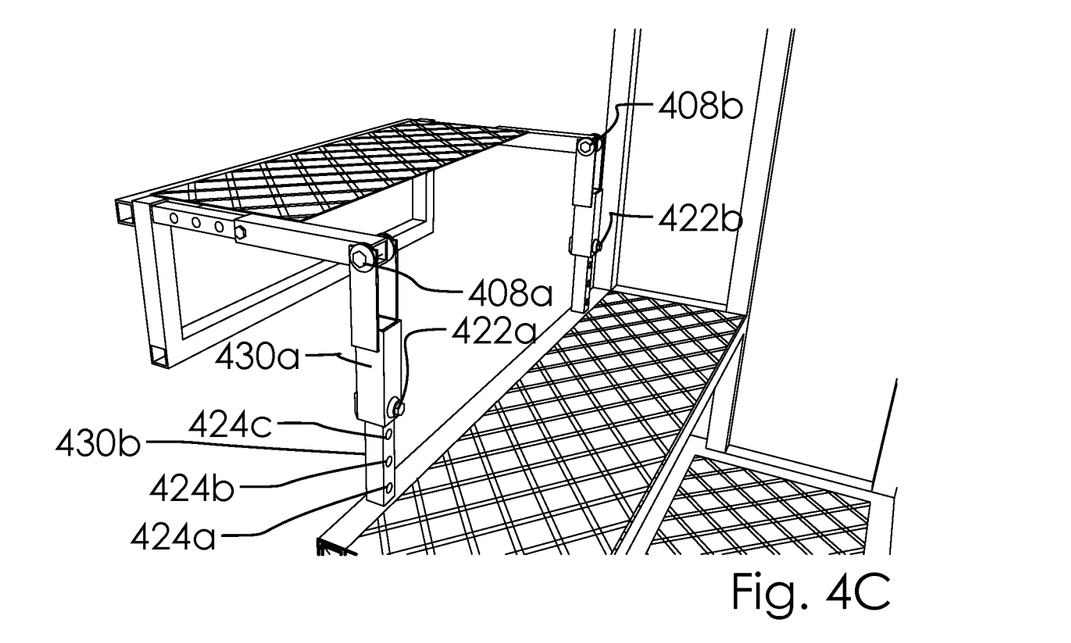
FIGS. 4C and 4D illustrate a perspective view of said adjustable step in a vertically expanded position and a retracted position, respectively.
Figure 4D:
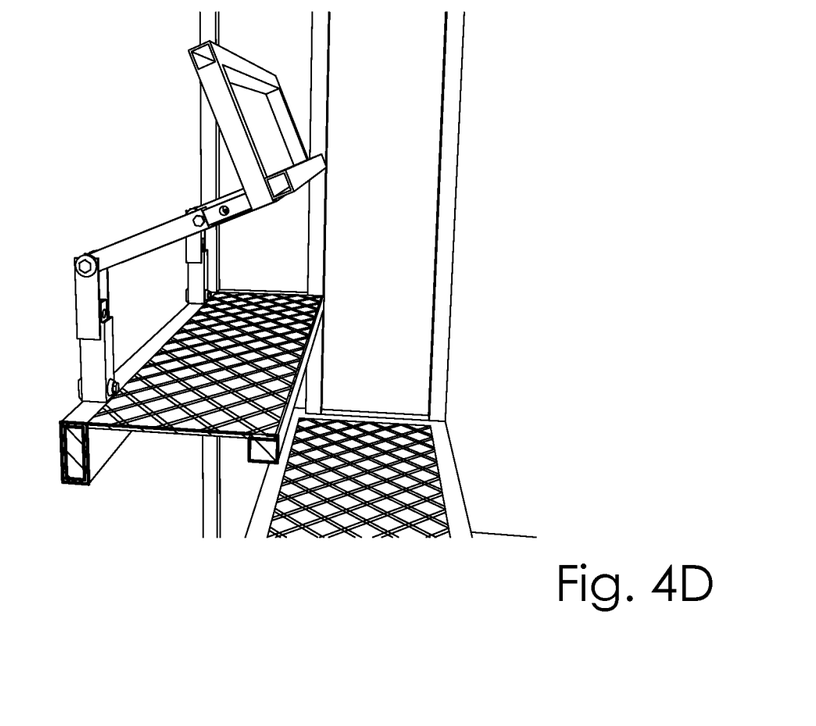

FIGS. 4C and 4D illustrate a perspective view of said adjustable step 104e in a vertically horizontally expanded position and a vertically retracted position, respectively. In one embodiment, vertical positions of said adjustable step 104e can be secured by a fastener 422a and a fastener 422b. In one embodiment, said one or more fasteners can securely fixate said adjustable step 104e in predefined vertical positions based on the location of adjustment hole 424a, adjustment hole 424b, and adjustment hole 424c. In one embodiment, said adjustment hole 424a, said adjustment hole 424b, and said adjustment hole 424c can be mirrored so that said adjustment holes exist on both left and right sides of said adjustable step 104e. In one embodiment, said adjustable step 104e can be adjusted vertically by disengaging said fastener 422a and said fastener 422b, lifting or pushing down on said adjustable step 104e to desired position based on said plurality of adjustment holes, and reengaging said fastener 422a and said fastener 422b. In one embodiment, said adjustable step 104e can be adjusted to permit proper clearance of tire height in order to use said vehicle step 100.

In one embodiment, said adjustable step 104e is secured to remainder of said vehicle step 100 by said one or more hinges. In one embodiment, said vehicle step 100 is placed in desired position next to the truck wheel and said adjustable step 104e can be rotated so that said bracket 402 is located next to the inside wall of the truck wheel and the top of said adjustable step 104e (or said adjustable step 104d) sits on or above the truck wheel. In one embodiment, said adjustable step 104e can be rotated back so that said adjustable step 104e sits above said first step 104a so that said vehicle step 100 can be moved away from a truck or stored away.

Figure 4E:
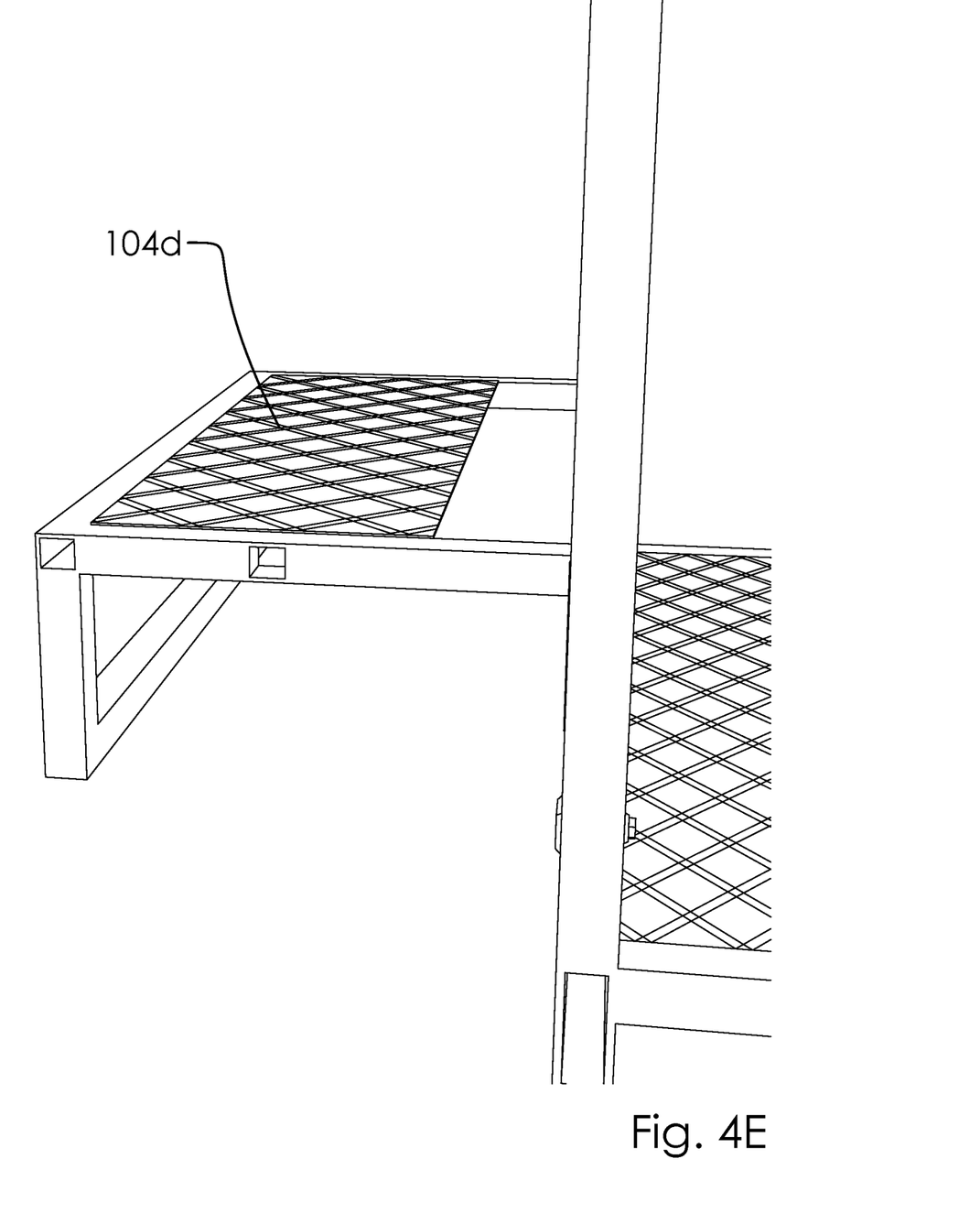
FIG. 4E illustrates a detailed perspective overview of said adjustable step.

FIG. 4E illustrates a detailed perspective overview of said adjustable step 104d.

Figure 5A:
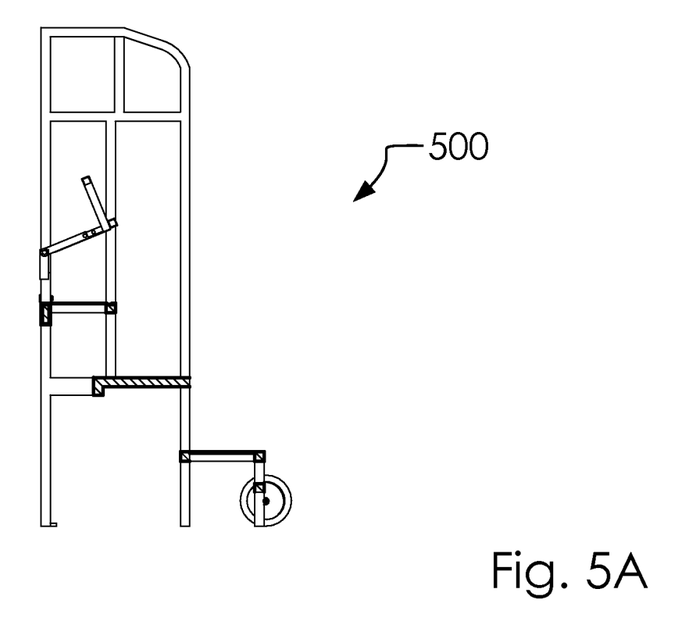
FIGS. 5A and 5B illustrate a left side view of said vehicle step with said adjustable step retracted and said vehicle step in movement, respectively.
Figure 5B:
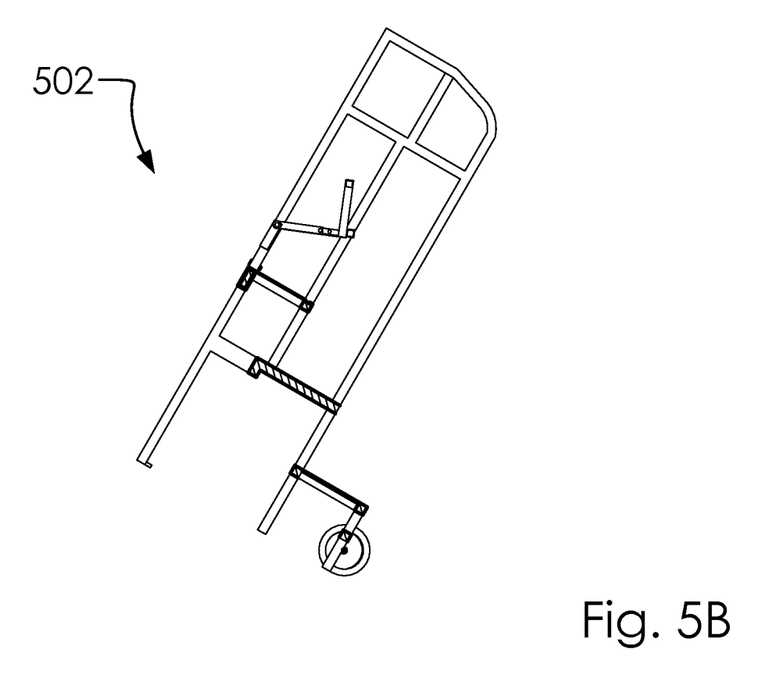

FIGS. 5A and 5B illustrate a left side view of said vehicle step 100 with said adjustable step 104e retracted and said vehicle step 100 in movement, respectively. In one embodiment, said adjustable step 104e can be retracted from truck tire and placed in a condensed configuration 500. In one embodiment, said vehicle step 100 can be in said condensed configuration 500 prior and after use and during storage of said vehicle step 100. In one embodiment, said vehicle step 100 can be in a movement configuration 502. In one embodiment, said vehicle step 100 can be in said movement configuration 502 by first being in said condensed configuration 500, holding said handrail 106, tilting said vehicle step 100, and moving said vehicle step 100 by using said wheel 112a and said wheel 112b. In one embodiment, said movement configuration 502 can be placed back into said condensed configuration 500 after said vehicle step 100 has reached a desired location.

Figure 6A:
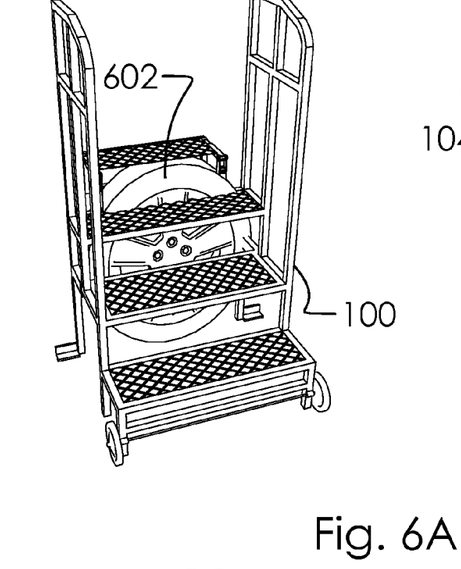
FIGS. 6A and 6B illustrate a perspective overview and a perspective rear view said vehicle step aligned with a wheel.
Figure 6B:
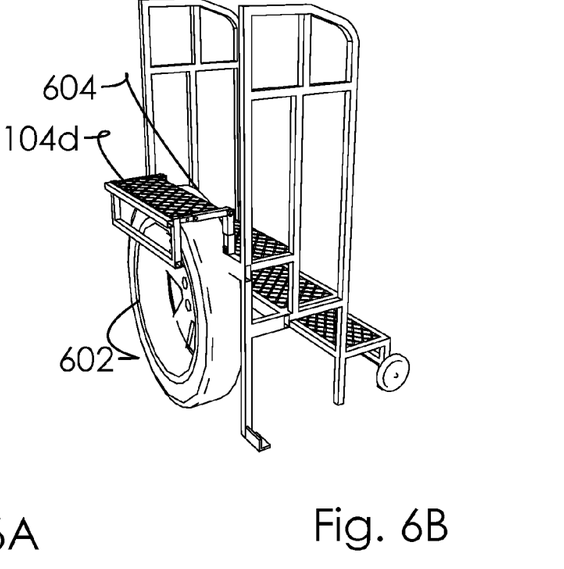

FIGS. 6A and 6B illustrate a perspective overview and a perspective rear view said vehicle step 100 aligned with a wheel 602. In one embodiment, said adjustable step 104d can rotate on said one or more hinges and rest on a top portion 604 of said wheel 602. In one embodiment, said adjustable step 104d can be configured to selectively rotate on said one or more hinges on a substantially horizontal axis between a non-engaged configuration (such as illustrated in FIG. 5A) and an engaged configuration (as illustrated in FIG. 6A); said vehicle step 100 can be configured to selectively attach to said wheel 602 of a vehicle by aligning a portion of said plurality of steps next to said wheel 602 with said vehicle step 100 in said non-engaged configuration, rotating said adjustable step 104d on said one or more hinges so as to set a portion of said adjustable step onto a top portion 604 of said wheel 602, and placing said adjustable step 104d into said engaged configuration.

Figure 7A:
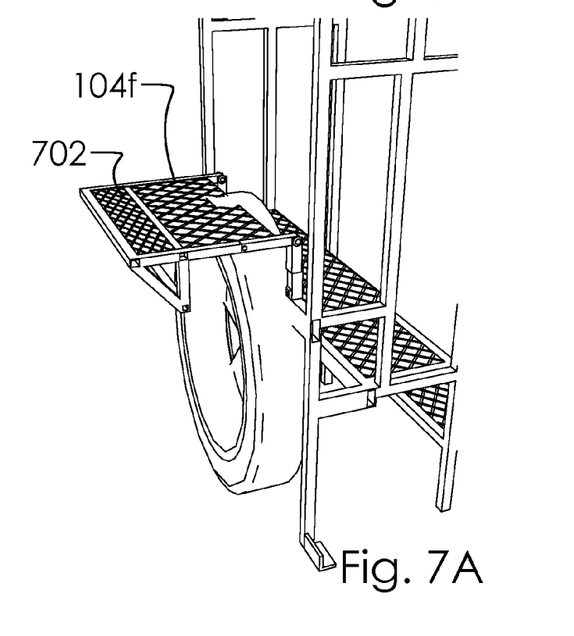
FIGS. 7A and 7B illustrate a perspective rear view said vehicle step with an adjustable step, and an elevated top view of an adjustable step.
Figure 7B:
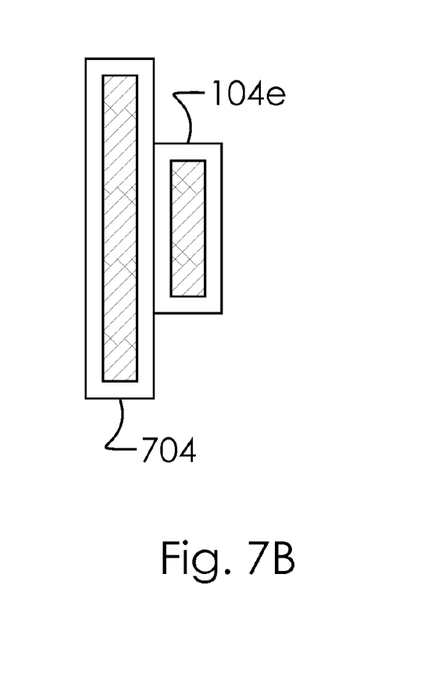

FIGS. 7A and 7B illustrate a perspective rear view said vehicle step 100 with an adjustable step 104e, and an elevated top view of an adjustable step 104f.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A vehicle step comprising:
    a frame and a plurality of steps;
    said vehicle step comprises a first side, a second side, a front, and a back;
    said frame supports said plurality of steps;
    said plurality of steps comprise, at least, a first step and an adjustable step;
    said first step serves as a platform for a user of said vehicle step to gain access to said adjustable step;
    said adjustable step comprises a one or more hinges;
    said adjustable step is rotateably attached to said frame;
    said adjustable step is configured to selectively rotate on said one or more hinges on a substantially horizontal axis between a non-engaged configuration and an engaged configuration; and
    said vehicle step is configured to selectively attach to a wheel of a vehicle by
        aligning a portion of said plurality of steps next to said wheel with said adjustable step in said non-engaged configuration,
        rotating said adjustable step on said one or more hinges so as to set a portion of said adjustable step onto a top portion of said wheel, and
        placing said adjustable step into said engaged configuration; wherein, one or more handrails are arranged along said first side and said second side of said vehicle step; and said one or more handrails are attached to said frame; wherein said frame comprises one or more horizontal portions, one or more vertical portions, one or more step frames, and one or more legs; wherein, said one or more step frames comprise a first step frame and an adjustable step flame; said one or more step frames support said one or more steps; said first step frame supports said first step; said adjustable step frame supports said adjustable step; said one or more vertical portions support said vehicle step at, at least, four corners of said frame; and said one or more step frames attach to said one or more vertical portions; wherein, said one or more step frames comprise four of said one or more horizontal portions arranged in a substantially rectangular pattern and further comprise a support across a central portion of said rectangular pattern; wherein, said adjustable step comprises a horizontally contracted position and an horizontally expanded position; said adjustable step comprises a plurality of adjustment holes and a fastener; said adjustable step comprises an outer tubing and an inner tubing; said inner tubing telescopes from within said outer tubing; said fastener selectively fixes said outer tubing to said inner tubing by aligning two among said plurality of adjustment holes and inserting said fastener therein; said horizontally contracted position comprises a larger portion of said inner tubing within said outer tubing, and said horizontally expanded position the inverse; said adjustable step comprises a vertically expanded position and a vertically retracted position; said adjustable step comprises a plurality of adjustment holes and a fastener; said adjustable step comprises an outer tubing and an inner tubing; said inner tubing telescopes from within said outer tubing; said fastener selectively fixes said outer tubing to said inner tubing by aligning two among said plurality of adjustment holes and inserting said fastener therein; and said retracted position comprises a larger portion of said inner tubing within said outer tubing, and said vertically horizontally expanded position the inverse.

2. The vehicle step of claim 1 further comprising:
    a wheel assembly attached at said front of said vehicle step to provide a tool for moving said vehicle step; and
    said wheel assembly is attached to a portion of a one or more vertical portions of said frame.

3. The vehicle step of claim 1 wherein:
    said adjustable step comprises a three or more edges and a substantially planar shape;
    said three or more edges comprise a rotating edge being aligned between said one or more hinges; and
    said adjustable step rotates around said rotating edge when transitioning between said engaged configuration and said non-engaged configuration.

* * * * *